United States Patent [19]

Mattfeld et al.

[11] Patent Number: 5,458,022
[45] Date of Patent: Oct. 17, 1995

[54] BICYCLE PEDAL RANGE ADJUSTING DEVICE

[76] Inventors: Raymond Mattfeld, 5 Adams Commons, Yapank, N.Y. 11980; Jeffrey Cohen, 2 Spruce St., Apt. 4G, Great Neck, N.Y. 11021

[21] Appl. No.: 151,968

[22] Filed: Nov. 15, 1993

[51] Int. Cl.$^6$ ................................................. G05G 1/14
[52] U.S. Cl. ............................................................. 74/594.1
[58] Field of Search ............................... 74/594.7, 594.4, 74/594.1

[56] References Cited

U.S. PATENT DOCUMENTS

| | | | |
|---|---|---|---|
| 625,986 | 5/1899 | Pennock | 74/594.1 |
| 4,850,245 | 7/1989 | Feamster et al. | 74/594.1 |

FOREIGN PATENT DOCUMENTS

| | | | |
|---|---|---|---|
| 0814128 | 5/1959 | United Kingdom | 74/594.7 |

*Primary Examiner*—Charles A. Marmor
*Assistant Examiner*—Mary Ann Battista
*Attorney, Agent, or Firm*—Michael I. Kroll

[57] ABSTRACT

A device is provided for range adjusting bicycle pedals in a bicycle having a frame with a crank hub, a drive sprocket and drive chain. The device consists of a crank axle extending through the crank hub, with the drive sprocket mounted on the crank axle to operate the drive chain. A pair of crank arms extend in opposite directions from the crank axle. A pair of pedals are provided. A structure is for mounting each pedal in an adjustable manner to each crank arm, so as to change the distance of the pedals to the crank axle. Someone who cannot fit on a standard bicycle properly, such as a child, an adult and an elderly person that has limited knee, hip and ankle movement, can still pedal the bicycle. In addition, status-post surgical patients would also benefit from the range adjusting device. In a modification the crank arms are adjustable to the crank axle instead of the pedals to the crank arms.

2 Claims, 2 Drawing Sheets

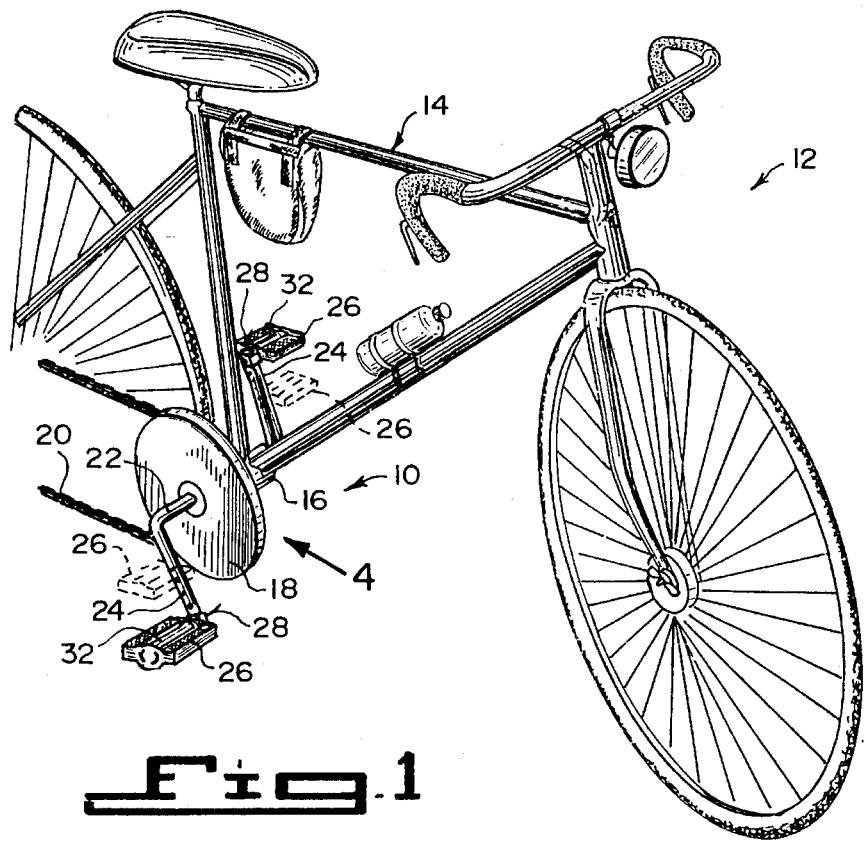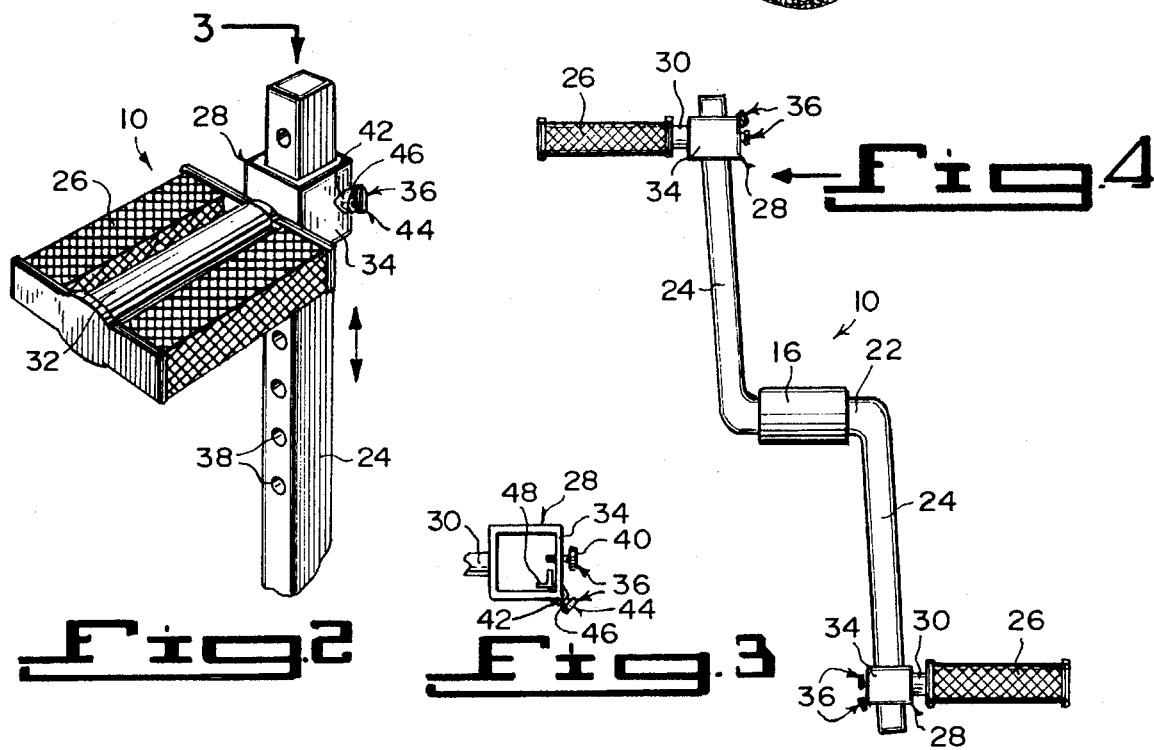

5,458,022

BICYCLE PEDAL RANGE ADJUSTING DEVICE

BACKGROUND OF THE INVENTION

1. Field of the Invention

The instant invention relates generally to bicycle pedals and more specifically it relates to a bicycle pedal range adjusting device.

2. Description of the Prior Art

Numerous bicycle pedals have been provided in prior art that are adapted to be connected to drive systems in which the pedals are used to operate crank assemblies in the drive systems. While these units may be suitable for the particular purpose to which they address, they would not be as suitable for the purposes of the present invention as heretofore described.

SUMMARY OF THE INVENTION

A primary object of the present invention is to provide a bicycle pedal range adjusting device that will overcome the shortcomings of the prior art devices.

Another object is to provide a bicycle pedal range adjusting device that can change the distance between the pedals and the crank axle from one to seven inches in which the seven inches is the normal distance.

An additional object is to provide a bicycle pedal range adjusting device that is necessary for someone who cannot fit on a standard bicycle properly, such as a child, an adult and an elderly person that has limited knee, hip and ankle movement, while in addition status-post surgical patients would also benefit from the range adjusting device.

A still additional object is to provide a bicycle pedal range adjusting device that maintains the normal biomechanical angle of pedaling.

A further object is to provide a bicycle pedal range adjusting device that is simple and easy to use.

A still further object is to provide a bicycle pedal range adjusting device that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a perspective view of a bicycle with parts broken away showing a first embodiment of the instant invention installed thereto, FIG. 2 is an enlarged perspective view of a portion of the first embodiment, FIG. 3 is a top view taken in direction of arrow 3 in FIG. 2 with the pedal broken away and the crank arm removed therefrom, FIG. 4 is an elevational view taken in direction of arrow 4 in FIG. 1 of just the first embodiment per se.

DETAILED DESCRIPTION OF THE PREFERRED EMBODIMENTS

Figure 5:
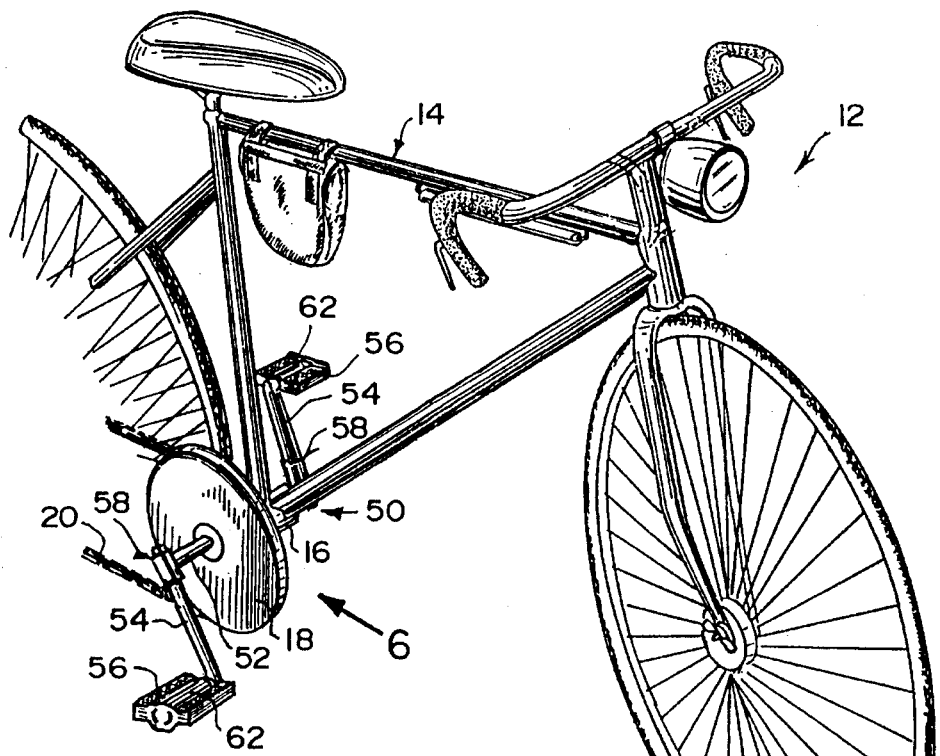
FIG. 5 is a perspective view similar to FIG. 1 showing a second embodiment of the instant invention installed thereto.

Turning now descriptively to the drawings, in which similar reference characters denote similar elements throughout the several views, FIGS. 1 through 4 illustrate a device 10 for range adjusting bicycle pedals in a bicycle 12 having a frame 14 with a crank hub 16, a drive sprocket 18 and drive chain 20. The device 10 consists of a crank axle 22 extending through the crank hub 16 with the drive sprocket 18 mounted on the crank axle 22 to operate the drive chain 20. A pair of crank arms 24 extend in opposite directions from the crank axle 22. A pair of pedals 26 are provided. A structure 28 is for mounting each pedal 26 in an adjustable manner to each crank arm 24, so as to change the distance of the pedals 26 to the crank axle 22. Someone who cannot fit on a standard bicycle properly, such as a child, an adult and an elderly person that has limited knee, hip and ankle movement, can still pedal the bicycle 12. In addition, status-post surgical patients would also benefit from the range adjusting device 10.

Each pedal 26 includes a central spindle 30 rigidly attached to the mounting structure 28, so as to extend outwardly from the bicycle 12 at a right angle from the crank arm 24. A central bearing 32 is rotatively attached to the central spindle 30.

The mounting structure 28 contains a pair of sleeves 34, each having a distal end of one central spindle 30 attached thereto. Each sleeve 34 slides upon one crank arm 24. A mechanism 36 is for retaining each sleeve 34 in a stationary position on each crank arm 24.

The retaining mechanism 36 for each sleeve 34 consists of the crank arm 24 having a plurality of spaced apart holes 38 therethrough. A pull pin 40 is carried on the sleeve 34 to engage with one of the holes 38 in the crank arm 24. The crank arm 24 is square shaped in cross section. The sleeve 34 is also square shaped in cross section. When the sleeve 34 fits on the crank arm 24 it will be prevented from rotating thereabout.

The retaining mechanism 36 for each sleeve 34 further includes an internally threaded collar 42, formed on one corner of the sleeve 34. A setscrew 44 has an externally threaded shank 46 in engagement with the collar 42. An angle member 48 is rotatively affixed to a distal end of the shank 46. When the setscrew 44 is tightened on the collar 42, the angle member 48 will press against one corner of the crank arm 24.

Figure 7:
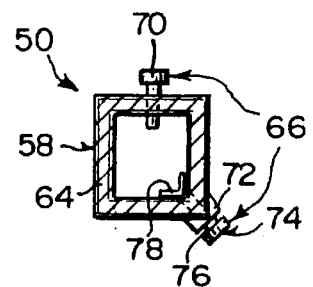
FIG. 7 is a cross sectional view taken along line 7—7 in FIG. 6 with the crank arm removed therefrom.
Figure 6:
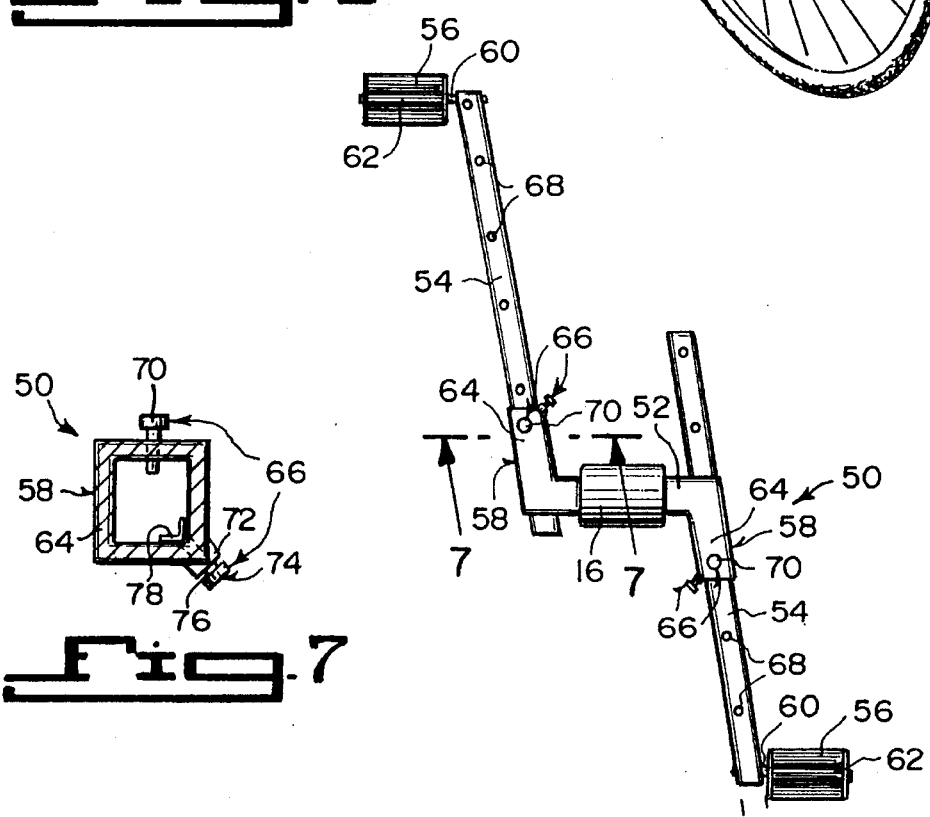
FIG. 6 is an elevational view taken in direction of arrow 6 in FIG. 5 of just the second embodiment per se.

FIGS. 5 through 7 show another device 50 for range adjusting bicycle pedals in a bicycle 12 having a frame 14 with a crank hub 16, a drive sprocket 18 and drive chain 20. The device 50 consists of a crank axle 52 extending through the crank hub 16, with the drive sprocket 18 mounted on the crank axle 52, to operate the drive chain 20. A pair of crank arms 54 are also provided. A pair of pedals 56 are each mounted to a distal end of each crank arm 54. A structure 58 is for mounting each crank arm 54 in an adjustable manner to the crank axle 52, while extending in opposite directions therefrom, so as to change the distance of the pedals 56 to the crank axle 52. Someone who cannot fit on a standard bicycle properly, such as a child, an adult and an elderly person that has limited knee, hip and ankle movement, can still pedal the bicycle 12. In addition, status-post surgical patients would also benefit from the range adjusting device 50.

Each pedal 56 includes a central spindle 60 rigidly attached to the distal end of one crank arm 54, so as to extend outwardly from the bicycle 12 at a right angle from the crank arm 54. A central bearing 62 is rotatively attached to the central spindle 60.

The mounting structure 58 contains a pair of sleeves 64, each attached to an opposite end of the crank axle 52. Each crank arm 54 slides within one sleeve 64. A mechanism 66 is for retaining each crank arm 54 in a stationary position in each sleeve 64.

The retaining mechanism 66 for each sleeve 64 consists of the crank arm 54 having a plurality of spaced apart holes 68 therethrough. A pull pin 70 is carried on the sleeve to engage with one of the holes 68 in the crank arm 54. The crank arm 54 is square shaped in cross section. The sleeve 64 is also square shaped in cross section. When the sleeve 64 fits on the crank arm 54, it will be prevented from rotating thereabout.

The retaining mechanism 66 for each sleeve 64 further includes an internally threaded collar 72 formed on one corner of the sleeve 64. A setscrew 74 has an externally threaded shank 76 in engagement with the collar 72. An angle member 78 is rotatively affixed to a distal end of the shank 76. When the setscrew 74 is tightened on the collar 72, the angle member 78 will press against one corner of the crank arm 54.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A device, comprising:
   a) a frame;
   b) a crank hub;
   c) a drive sprocket;
   d) a drive chain;
   e) a crank axle extending through the crank hub, with the drive sprocket mounted on said crank axle to operate the drive chain;
   f) a pair of crank arms extending in opposite directions from said crank axle;
   g) a pair of pedals, each said pedal including a central spindle extending outwardly from the frame at a right angle from said crank arm, and a central bearing rotatively attached to said central spindle; and
   h) means for mounting each said pedal in an adjustable manner to each said crank arm, so as to change the distance of said pedals to said crank axle, whereby someone who cannot fit on a standard bicycle properly, can still pedal the bicycle, said mounting means including a pair of sleeves, each having a distal end of one said central spindle rigidly attached thereto, wherein each said sleeve slides upon one said crank arm, and means for retaining each said sleeve in a stationary position on each said crank arm, said retaining means for each said sleeve including said crank arm having a plurality of spaced apart holes therethrough, and a pull pin carried on said sleeve to engage with one of said holes in said crank arm, said crank arm being square shaped in cross section, and said sleeve being square shaped in cross section, so that when said sleeve fits on said crank arm it will be prevented from rotating thereabout, said retaining means for each said sleeve further including an internally threaded collar formed on one corner of said sleeve, a setscrew having an externally threaded shank in engagement with said collar, and an angle member rotatively affixed to a distal end of said shank, so that when said setscrew is tightened on said collar, said angle member will press against one corner of said crank arm.

2. A device, comprising:
   a) a frame;
   b) a crank hub;
   c) a drive sprocket;
   d) a drive chain;
   e) a crank axle extending through the crank hub with the drive sprocket mounted on said crank axle to operate the drive chain;
   f) a pair of crank arms;
   g) a pair of pedals, each mounted to a distal end of each said crank arm, each said pedal including a central spindle rigidly attached to said distal end of one said crank arm, so as to extend outwardly from the frame at a right angle from said crank arm, a central bearing rotatively attached to said central spindle; and
   h) means for mounting each said crank arm in an adjustable manner to said crank axle, while extending in opposite directions therefrom, so as to change the distance of said pedals to said crank axle, whereby someone who cannot fit on a standard bicycle properly, can still pedal the bicycle, said mounting means including a pair of sleeves, each attached to an opposite end of said crank axle, wherein each said crank arm slides within one said sleeve, and means for retaining each said crank arm in a stationary position in each said sleeve, said retaining means for each said sleeve including said crank arm having a plurality of spaced apart holes therethrough, and a pull pin carried on said sleeve to engage with one of said holes in said crank arm, said crank arm being square shaped in cross section, and said sleeve being square shaped in cross section, so that when said sleeve fits on said crank arm it will be prevented from rotating thereabout, said retaining means for each said sleeve further including an internally threaded collar formed on one corner of said sleeve, a setscrew having an externally threaded shank in engagement with said collar, and an angle member rotatively affixed to a distal end of said shank, so that when said setscrew is tightened on said collar said angle member will press against one corner of said crank arm.

* * * * *